April 20, 1943.　　　　　L. GOODALE　　　　　2,317,143
CARBON ELECTRODE ASSEMBLY
Filed Aug. 27, 1942
FIG.1.
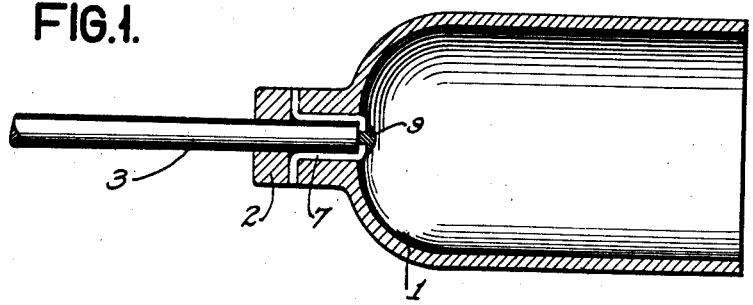
FIG.2.
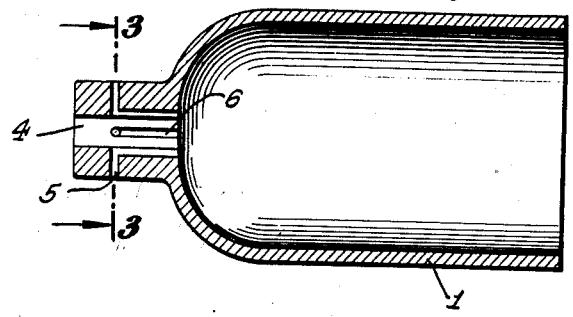
FIG.3.
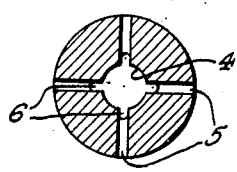
FIG.4.
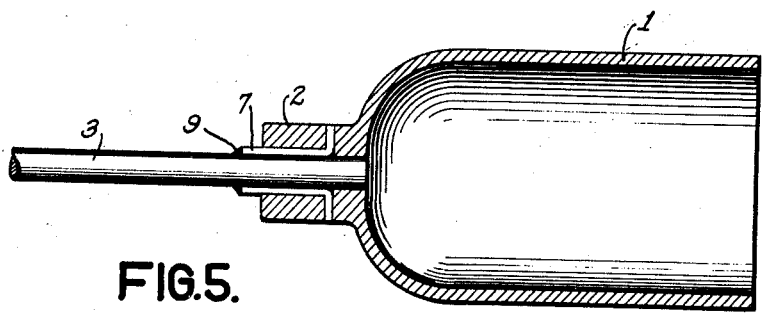
FIG.5.
INVENTOR.
LYNN GOODALE
BY
James N. Curtin
ATTORNEY Patented Apr. 20, 1943

2,317,143

UNITED STATES PATENT OFFICE 2,317,143

CARBON ELECTRODE ASSEMBLY

Lynn Goodale, Newark, N. J., assignor to Federal Telephone and Radio Corporation, a corporation of Delaware Application August 27, 1942, Serial No. 456,314

13 Claims. (Cl. 250—27.5)

This invention relates to the art of vacuum tube construction and in particular to a method of attaching a carbon electrode to a tungsten lead.

Due to the fact that tungsten is a material which can not be machined by ordinary methods it has been customary to weld to the tungsten lead a short length of some other metal, usually molybdenum, this latter material having been suitably machined in order that it may be screwed into or otherwise fastened to the carbon electrode. Other equivalent methods have also been employed but in so far as I am aware they are all based on a method in which a machinable material is welded to the tungsten lead and then in some manner fastened to the carbon electrode. It is very desirable to use tungsten as a lead-in material since it is capable of being readily sealed through the wall of a glass tube blank, making therewith a very satisfactory and leak-proof metal to glass seal.

The primary purpose of the present invention is to devise a method for directly fastening a tungsten lead to a carbon electrode without the necessity of first welding a machinable material to the tungsten. Another object of the invention is to make a unit assembly of a carbon electrode and a tungsten lead which is cheaper and more easily constructed than those of the prior art. Other objects of the invention will be apparent to those skilled in the art as I proceed with the specification and a description of the drawing of which:

Fig. 1 is a sectional view of the assembled carbon electrode and tungsten lead;

Fig. 2 is a section showing the manner in which the carbon electrode is prepared before assembly;

Fig. 3 is a section taken through A—A of Fig. 2;

Fig. 4 is a connector or key employed in the assembly of the unit and

Fig. 5 is an alternate assembly arrangement to that shown in Fig. 1;

Referring to Fig. 1 the reference numeral 1 represents a carbon electrode in the form of a cup-shaped anode having an extension or boss 2 into which a tungsten lead 3 is inserted. As shown in Figs. 2 and 3 a hole 4 is drilled or otherwise formed in the extension 2 so as to form a tight fit with the tungsten lead 3. At an angle (preferably a right angle) to the hole 4 a plurality of radial holes 5 are drilled or otherwise formed in the extension. Extending from the radial holes 5 and toward the inside of the cup-shaped anode slots or key-ways 6 are formed. The size of the holes 5 and key-ways 6, is such that a key 7 forms a snug fit therewith. The shape of the key 7 is shown in Fig. 4 and the dimensions of this key are such that it combines with the carbon electrode and tungsten lead to produce a finished assembly as shown in Fig. 1.

In assembling the unit a key is first inserted into each of the holes 5 and slot 6 and the tungsten lead 3 is then placed in the hole 4 to a point where it abuts the extension or bent-over portion 8 of the key. While held in this position the portion 8 is welded to the tungsten as shown at 9. It will now be obvious that it is impossible to withdraw the lead or to rotate it within the carbon electrode and that a firm and rigid connection results therefrom.

An alternative method of connecting the tungsten to the carbon electrode is shown in Fig. 5 wherein the slots 6 are made to extend outwardly to the end of the boss 2. In this case the key 7 has no bent portions 8 to which the tungsten lead is abutted. The key is welded to the tungsten lead at the point 9.

It is obvious that any number of keys may be employed depending on the size of carbon electrode and the diameter of the tungsten lead. Although I have illustrated a case in which four keys are employed, in many cases two keys, or even one, would be sufficient to produce a rigid connection. The current carrying capacity of the connection depends to some extent on the number of keys employed and this factor should be taken into account in any given design. All parts should fit as snugly as possible to keep the resistance of the connection at a minimum.

Although this invention has been described as pertaining to a method of connecting a carbon electrode to a tungsten lead, the invention is of course equally applicable in cases wherein a lead consisting of a metal other than tungsten is employed.

Having thus described my invention I claim:

What is claimed is:

1. An electrode assembly comprising an electrode provided with a hole to receive a lead member, a lead member disposed in said hole, key means disposed in said electrode adjacent to said hole, and a weld connecting said lead member with said key means whereby said lead member is secured to said electrode.

2. An electrode assembly comprising an electrode provided with a hole to receive a lead member, a lead member disposed in said hole, groove means formed in said hole, key means disposed in said groove means, and a weld fastening said lead member to said key means whereby said lead member is secured to said electrode.

3. An electrode assembly according to claim 1 in which the electrode is of carbon.

4. An electrode assembly according to claim 1 in which the lead member is of tungsten.

5. An electrode assembly according to claim 1 in which the electrode is of carbon and the lead member is of tungsten.

6. An electrode assembly comprising a carbon electrode provided with hole having grooves formed in the surface thereof, a lead member fitted into said hole, key members disposed in said grooves, means for securing said key members to said lead member, and means formed on said key members for preventing withdrawal of said lead member from said hole when secured to said key members.

7. An electrode assembly according to claim 6 in which said lead member is of tungsten and in which said key members are secured to said lead member by welding.

8. An electrode assembly comprising a carbon electrode, a metallic lead, said carbon electrode having a hole therein for receiving said lead, means for retaining said lead within said hole comprising an L-shaped key one portion of which lies parallel to said lead and another portion of which lies at an angle to said lead, and a weld between said lead and said key, 9. An electrode assembly in accordance with claim 1 and wherein the metallic lead is of tungsten.

10. A carbon electrode, a boss extending from said electrode, a metallic lead, said boss having a first hole therein and receiving said lead, said boss having a second hole therein inclined to and intersecting said first hole, a groove in said boss adjacent said first hole and extending from said second hole to one end of said boss, an L-shaped key welded to said lead and substantially filling said second hole and said groove.

11. An electrode assembly comprising a carbon electrode, a metallic lead, an L-shaped key, said carbon electrode being formed so as to receive said lead and said key and a welded connection between said lead and said key.

12. A carbon electrode, a carbon extension thereto, a plurality of intersecting holes in said extension, a groove in said extension, a metallic lead extending into one of said holes, an angle shaped key extending into another of said holes and said groove, and a welded connection between said lead and said key.

13. The method of rigidly connecting a carbon electrode to a tungsten lead which comprises forming a hole and an angle-shaped keyway in said electrode, placing an angle-shaped key in said keyway, placing said lead in position in said hole and welding said key to said lead.

LYNN GOODALE.